United States Patent [19]

Anderson

[11] 4,022,184
[45] May 10, 1977

[54] LATERAL LENS ARRANGEMENT FOR SOLAR ENERGY CONVERSION DEVICES

[75] Inventor: Donald E. Anderson, Northfield, Minn.

[73] Assignee: Sheldahl, Inc., Northfield, Minn.

[22] Filed: Mar. 10, 1975

[21] Appl. No.: 556,650

[52] U.S. Cl. .............................. 126/271; 237/1 A
[51] Int. Cl.² .......................................... F24J 3/02
[58] Field of Search ............ 237/1 A; 126/270, 271

[56] References Cited

UNITED STATES PATENTS

| 811,274 | 1/1906 | Carter | 126/271 |
|---|---|---|---|
| 1,946,184 | 2/1934 | Abbot | 126/271 |
| 2,182,222 | 12/1939 | Courtis et al. | 126/271 |
| 2,213,894 | 9/1940 | Barry | 126/271 |
| 2,998,006 | 8/1961 | Johnston | 126/271 |
| 3,847,136 | 11/1974 | Salvail | 126/271 |
| 3,884,217 | 5/1975 | Wartes | 126/271 |

*Primary Examiner*—Kenneth W. Sprague
*Attorney, Agent, or Firm*—Orrin M. Haugen

[57] ABSTRACT

A solar heat concentrator comprising, in combination, solar radiation concentrator means and absorber means for converting the concentrated solar energy into usable form. The concentrator means is essentially a line focus Fresnel array, and includes a plurality of generally parallelly disposed elongated self-supporting elements with reflective surfaces, each element having means for positioning the reflective surfaces in an operative solar viewing disposition, as well as in an inoperative or idle disposition wherein the reflective surfaces are protected from adverse affects due to the elements, including wind, dust, hail, and the like. The radiation absorber means includes an elongated fluid transfer duct of closed cross-section such as an elongated cylinder, with the axis of the fluid transfer duct being generally parallel to the longitudinal axis of the array of reflective surfaces, and with the peripheral surface of the fluid transfer duct having an energy adsorptive zone viewing the concentrator means at substantially the focal point of the concentrator, the balance of the peripheral surface of the absorber being thermally insulated.

20 Claims, 15 Drawing Figures

LATERAL LENS ARRANGEMENT FOR SOLAR ENERGY CONVERSION DEVICES

BACKGROUND OF THE INVENTION

The present invention relates generally to an improved solar energy collector, and more particularly to a solar heat concentrator which includes, in combination, a solar radiation concentrator means in the form of a line focus Fresnel array, and an absorber means cooperating with the array for receiving the concentrated solar energy. With the continuing utilization and ultimate partial depletion of available fossil fuels, alternate sources of energy have become desirable, provided feasible means and techniques can be found for their utilization. In this connection, solar energy may be employed as a high-grade power source for the generation of usable energy with this source of energy being freely available and non-polluting to the environment. Conversion of solar energy into usable energy may typically be achieved by thermodynamic arrangements, such as, for example, by the generation of steam or other heated fluid for ultimate utilization at a power conversion site. One approach which is commonly taken for conversion of solar energy is the utilization of flat absorbers to heat a fluid transfer medium such as water, the heated water then being transferred to either a thermally insulated reservoir or a zone wherein heat may be extracted. Such absorbers are normally referred to as "flat plate collectors." Since collector surface area must be substantial, the cost of such collectors along with the thermal efficiency at low ambient temperatures renders certain designs disadvantageous. These disadvantages are overcome with the structure and design of the present invention.

In conventional or known solar energy systems, such as flat plate collectors or the like, a number of common problems have existed and the existence of these problems has retarded the growth and acceptance of solar heating systems. Normally, the primary problem is the initial on-site installation cost, with this cost normally being large due to the excessive size of conventional systems. Furthermore, complex manifolding of the individual collectors in the system has presented problems due to leakage effects and the like. The weight of the installation has also presented problems, particularly the weight of a fluid-loaded system. When a roof mounted flat plate system is specified, particularly in an existing structure, the load bearing capability of the structure is frequently insufficient to support the fluid-loaded systems and structural supports must be provided. A further problem has existed with most flat plate solar heating elements, due to the low velocities normally utilized in the system. With low velocities, fluid corrosion and plugging of transmission lines may be more likely to occur than in systems employing high velocity transfer rates.

Conventional flat plate systems are normally cost-effective only if both heating and cooling may be achieved in a single installation, with a coefficient of performance being necessarily greater than about 0.6 in the cooling mode. With the existence of such a requirement, gaseous fluid cooling is not generally feasible.

In the present solar heat concentrator system, the design illustrated is one employing generally horizontally disposed cylindrical parabolas forming the array. It will be appreciated, of course, that generally vertically disposed cylindrical parabolas may be employed to form the line array, with the collector or absorber means being arranged generally accordingly, and with the elongated axis of the cylindrical parabolas being, of course, generally parallel to the elongated axis of the collector or absorber.

It has been predicted that the total electrical power demand for the United States of America in the year 1980 will be approximately $9 \times 10^{12}$ Kilowatt-hours. This power demand is substantially equivalent to that amount of incident solar radiation falling upon an area of only 1,531 square miles of land area located at approximately 33° North Latitude in a given year. Such a latitude is substantially coincident with that of the State of Arizona. Assuming an efficiency of conversion to solar energy to electrical energy of only 15%, the area required to obtain the projected electrical power demand for the United States of America in the year 1980 is approximately 10,000 square miles, with the area reasonably being expected to provide at least a substantial portion of the projected electrical power demand for the United States of America for the calendar year 1980.

Solar energy is, of course, available for immediate conversion without further depletion or utilization of fossil fuels. The system of the present invention renders it possible to fabricate relatively modest solar energy conversion plants suitable for use in heating and cooling of residential dwellings, as well as commercial establishments with modest to moderate power requirements. This system efficiently and economically converts solar energy to other usable forms of energy at an amortized cost no greater than that cost required for fossil fuel conversion.

At those latitudes in which the United States of America is situated, sunlight is never available on a 24-hour per day basis, and at the same time, each day of the solar year provides a certain reasonable amount of potential sunlight. The sun is, nevertheless, available for exposure to the surface of the ground for a maximum of 50% of the total time of a given year within any given location. Depending upon climatic conditions, there will be a reduction from the 50% maximum occasioned by cloud cover, as well as a reduction due to the presence of natural or artificial obstacles. However, with the time available for exposure to the sun, it is, nevertheless, economically feasible to employ solar energy as the primary source of energy, with this primary source being supplemented by available fossil fuels. It will be appreciated that the utilization of fossil fuels may be required only during the night-time hours, or upon the occurrence of periods of heavy and extended cloud cover.

SUMMARY OF THE INVENTION

The system of the present invention employs an array of solar reflectors, grouped together so as to form a solar radiation concentrator means in the form of a line focus Fresnel array, with each of the reflective elements being focused upon a solar absorber means, the solar absorber preferably being in the form of one or more elongated cylindrical ducts. With this system, as in certain others, it is possible to achieve solar power dependency for a given installation in substantial excess of the available sun time by means of utilization of energy storage, such as, for example, the use of heat-pumps, thermal storage vessels, reversible hydraulic pumping, reversible electrolysis or electrolytic cells, or electrolysis with storage of evolved oxygen and hydrogen. In the electrolysis sytem, the evolved gases subsequently are combined for burning, thus replacing the fossil fuels which may otherwise be required. At the present time, local weather forecasting techniques are sufficiently sophisticated so as to provide a reasonably accurate prediction for at least a 24-hour period, hence it is reasonably possible to anticipate demand requirements and ultimate availability of solar energy to meet these demand requirements.

Briefly, in accordance with the present invention, a solar heat concentrator is provided which includes a line focus Fresnel array of solar reflective elements which, in combination, provide a solar radiation concentrator means, this radiation concentrator means functioning in combination with solar absorber means for receiving the concentrated solar energy and converting the energy into a form which will render it usable in a conventional fashion. The reflective elements comprise a plurality of generally parallelly disposed of elongated elements having a reflective surface thereon so as to form a line focus Fresnel reflective array, with means being provided for the purpose of compensating for diurnal changes in solar elevation, thereby adjustably positioning the angular elevational disposition of each of the reflective surfaces into a desired solar viewing disposition. The individual reflective elements are ganged together so as to tiltably compensate for solar elevation changes, with linkage means being provided to effectively gang the surfaces together. Inasmuch as the array contemplates a line focus, azimuth compensation is not normally required. Also, means are provided for rotatably positioning the individual reflective elements forming the array in inverted inoperative or idle disposition so as to provide a means of protecting the surface from continued exposure to the elements, such as adverse conditions due to hail, blowing dust, and the like.

The absorber means includes an elongated fluid transfer duct, preferably cylindrical and having its cylindrical axis extending generally parallel to the elongated axis of the reflective surfaces. The cylindrical fluid transfer duct has a closed peripheral surface, with the outer periphery having an energy absorptive portion or zone arranged in viewing relationship to the reflective surfaces, with this portion of the outer periphery of the fluid transfer duct being disposed at or along the focal point of the line focus Fresnel array. That portion of the periphery of the fluid transfer duct which is not in viewing relationship to the reflective elements, or is otherwise remote from the focal point, is normally covered with a thermal barrier for substantially reducing thermal energy losses from the fluid transfer duct. Preferably, the radiation absorber means is disposed at a location between the sun and the reflective surfaces, and at an elevation which is vertically above the plane of the reflective elements. In order to concentrate the incident solar radiation, the elongated reflective elements which form the reflective surfaces are preferably formed as arcuate segments defining cylindrical parabolas, although it will be appreciated that flat reflective surfaces may be employed in certain installations as well. The focal length of each of the parabolas will therefore be substantially equal to the distance from the reflective surface to the surface of the absorber means. In order to accommodate the diurnal arcuate elevational movements of the sun, the individual cylindrical reflective parabolas will be arcuately rotated at a rate equal to these movements during the daytime hours. Preferably, the individual structures carrying the reflective surfaces are ganged together so as to move the surfaces as a unit. In other words, in order to compensate for differences in the angular reflection required to focus the reflective surfaces onto the absorber means, the individual cylindrical parabolas will be adjusted to achieve the approximation of a lateral Fresnel lens. Accordingly, the entire array of cylindrical parabolas may be rotated in time with the diurnal movements of the sun in order to maintain the focal point for the incident solar radiation upon the surface of the absorber means.

Also, in order to protect the reflective surfaces from adverse weather conditions such as hail storms, dust storms, and the like, means are provided for rotating the individual reflective surfaces to an inoperative or idle disposition wherein the reflective surfaces are pointed downwardly toward the ground or other supporting surface. In certain instances, it may be desirable to provide for adjustably tilting the elevation angle of the lateral end support columns for the arrays so as to maximize the effectiveness of the reflective surfaces, while minimizing shadowing effects.

Adjustable control of the angular disposition of the individual reflective elements may be accomplished with a single drive motor operating a gang of prearranged reflective elements. Similar techniques may be utilized in order to control the angular disposition of the lateral support elements so as to achieve control of the "shadowing effect" of individual reflective elements, one upon another, however due to the slow rate of change of solar elevation between the seasons of the year, this angular adjustment feature need not be automatically accomplished.

The individual structures forming the reflective surfaces are preferably cylindrical parabolas and are normally designed to be held in end support columns. Therefore, it is preferable that the individual elements forming the reflective assemblies or cylindrical parabolas be free standing, non-deforming, and accordingly optically stable. Inasmuch as the individual elements are ganged together, and inasmuch as the elements may be rotated from only one of the two spaced end supports, the cylindrical parabolas will be functioning as torque-tubes and therefore they should be sufficiently rigid so as to withstand the forces to which they are subjected. The mechanical requirements for the collector are, of course, consistent with those of the reflectors. The collector must be sufficiently rigid so as to be non-deforming between supports, and must be capable of compliance while withstanding the design temperatures to which it is being exposed.

Because of the design characteristics of the system, it is possible to retro-fit the system to existing structures as well as to apply the system as the primary thermal system in new construction. The capability of protecting the individual reflective elements during extreme weather conditions also provides a safeguard against burn-out of the collector under no-load conditions. In other words, under a situation wherein there is no call for additional energy, the individual reflector elements forming the line focus Fresnel array are de-focused, such as by turning the reflective surface toward the ground.

By way of location relative to the demand area, it will be appreciated that the system collector can be used in any location with good sun exposure. Examples of such locations include parking lots, fence lines, roofs of commercial and residential structures, and South-facing walls.

Therefore, it is a primary object of the present invention to provide an improved solar heat concentrator which comprises in combination, a solar radiation concentrator means and absorber means for receiving the concentrated solar energy from the concentrator, the concentrator means comprising a plurality of generally parallelly disposed reflective elements forming a line focus Fresnel array focused upon a surface absorber means.

It is a further object of the present invention to provide an improved solar heat concentrator which comprises in combination, a solar radiation concentrator means in the form of a line focus Fresnel array and an absorber means for receiving the concentrated solar energy, the absorber means including an elongated fluid transfer duct preferably having a cylindrical axis and extending generally parallel to the elongated axis of the reflective array, and with the peripheral surface of the absorber means including a thermal energy absorptive zone and a thermal insulative zone, with the absorptive zone being in viewing relationship to the reflective surfaces of the reflective array, and disposed generally within the focal line thereof.

It is yet a further object of the present invention to provide an improved solar heat concentrator means which employs a solar radiation concentrator means and an absorber means for receiving concentrated solar energy, the solar radiation concentrator means comprising a plurality of generally parallelly disposed cylindrical parabolas forming a line focus Fresnel array, each having a reflective surface with the focal line of each of the reflective surfaces being generally coincident with the surface of the absorber means, and with means being provided to simultaneously control the disposition of each reflective surface in the array so as to maintain the reflective surface in solar viewing disposition.

It is yet a further object of the present invention to provide an improved solar heat concentrator which comprises a solar radiation concentrator means and absorber means for receiving the concentrated solar energy, and wherein a plurality of generally parallelly disposed cylndrical parabolas are provided forming a line focus Fresnel array, each having a reflective surface with a focal line generally concident with the surface of the absorber means, and with drive means being provided to gang position each of the reflective surfaces in solar viewing-collector reflecting disposition, and further being provided with means to rotate the solar reflective surface into a non-solar viewing disposition either under no-load conditions, or to shield or otherwise protect the reflective surface in the event of adverse weather conditions such as falling hail, blowing dust, or the like.

Other and further objects of the present invention will become apparent to those skilled in the art upon a study of the following specification, appended claims, and accompanying drawings.

DESCRIPTION OF THE PREFERRED EMBODIMENT

Figure 1:
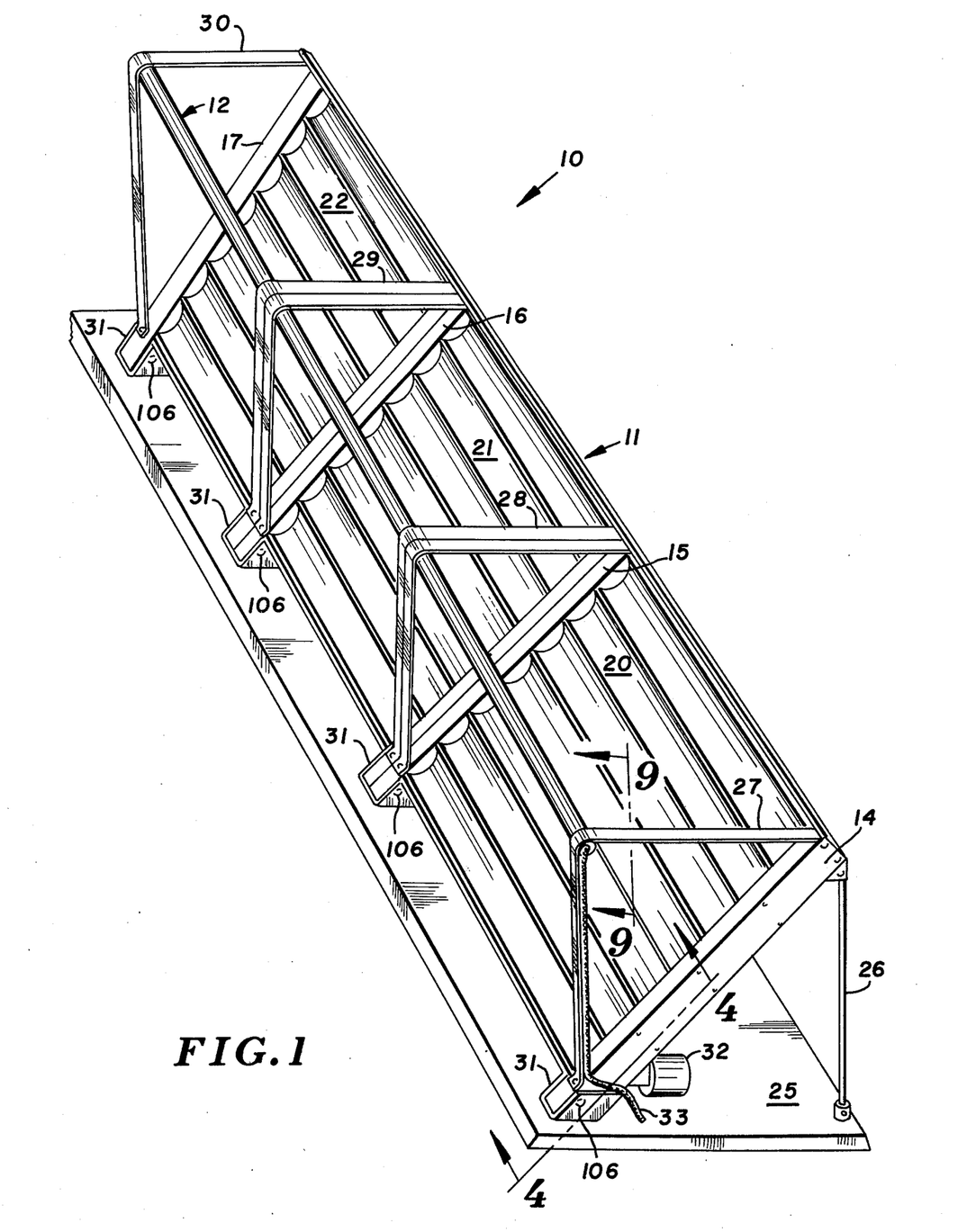
FIG. 1 is a perspective view of a typical installation utilizing the line focus Fresnel array of reflective elements in combination with a fluid transfer absorber means.

In accordance with the preferred embodiment of the present invention, and with particular attention being directed to FIG. 1 of the drawings, the solar heat collector system generally designated 10 comprises, in combination, a solar radiation concentrator means in the form of a line focus Fresnel array generally designated 11, together with an absorber means generally designated 12. In the concentrator means, a plurality of lateral support columns are provided for the array 11 as at 14, 15, 16 and 17 with the support columns being provided to establish spaced supports for the free standing non-deforming slat elements such as the elements included in the array 11. As is apparent from FIG. 1, three individual arrays are being employed, these arrays being identified at 20, 21 and 22. Each of the individual slats or cylindrical parabolas incorporated in the system is identical, one to the other, and hence the description of one such element will suffice for a description of all.

Support means are provided for the solar heat concentrator means such as a base pad 25 having support posts along each of the columns 14, 15, 16 and 17 as at 26. A bracket means is provided for supporting the absorber 12 along each column as well, such as is illustrated at 27, 28, 29 and 30. Suitable mounting pads are provided for the individual columns 14-17 inclusive, such as at 31-31. As will be made more apparent hereinafter, a drive motor is provided for the arrays 20, 21 and 22 such as is illustrated at 32, with one motor driving one or more arrays. Transfer fluid is provided for the absorber through a liquid feed line 33, with an outlet or discharge line (not shown) being provided at the opposed end of absorber 12, or, alternatively, coincidentally with liquid line 33 either being coaxially arranged or parallelly disposed.

As has been indicated, the individual reflectors are ganged together so as to achieve a line focus on the absorber means. With attention now being directed to FIG. 2 of the drawings, an example of a system schematic is illustrated wherein a line focus Fresnel array of reflectors in the system 11 is focused upon the absorber means 12, with an inlet line being illustrated at 33 and an outlet or discharge line being illustrated at 33A. The heated fluid passing through absorber 12 is forced by means of pump 35, with insulated storage vessel 36 being employed to retain the heated fluid for distribution through other zones, as required. Storage vessel 36 is adapted to retain fluid at an elevated temperature, such as from 200° F. to about 500° F. Temperature gauges 37 and 38 monitor the condition of the fluid entering the vessel 36 as well as the material within vessel 36. Pump 40 is used to carry fluid from vessel 36 to any of the working stations or zones such as the heat exchanger for building heat as at 41, a hot water tank as at 42, a heat exchanger for absorbing air conditioning as at 43, as well as a zone for process heating as at 44. Alternatively, a mechanically coupled compressor may be utilized to provide air conditioning and potential heat pumping with mechanical energy being delivered by a Rankine Cycle Prime Mover powered by the stored solar heat. In the illustrated system, individual valves such as 41A, 42A, 43A and 44A control the flow of fluid from pump 40 to each of the individual zones, as illustrated, with three-way valve 45 being employed to direct the return flow either to storage vessel 36 or to pump 35. Thus, it will be seen that the system has application to a variety of processes, and is essentially without limitation in this regard. Also, as has been indicated, it is possible to employ auxiliary heat as at 41B, 42B, 43B and 44B for the individual lines from vessel 36 in order to deliver fluid at a constant elevated temperature.

Figure 3:
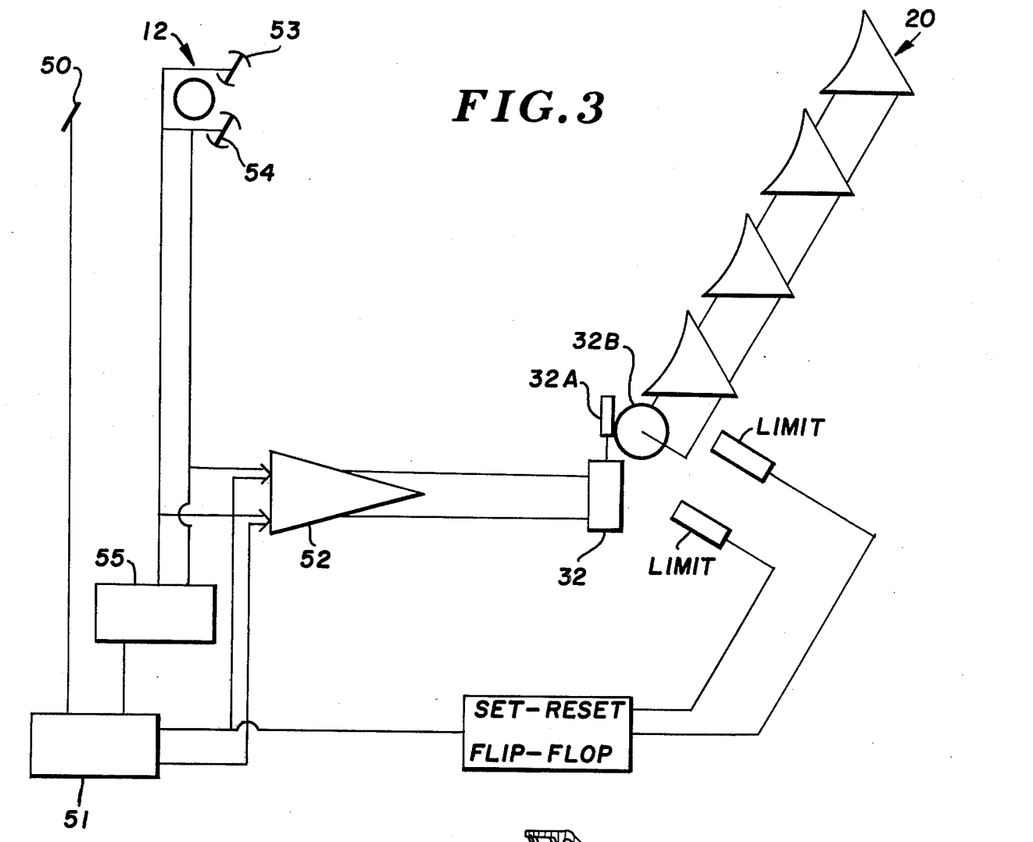
FIG. 3 is a schematic diagram of a drive and tracking system that may be employed in combination with the system of the present invention.

Attention is now directed to FIG. 3 of the drawings wherein a drive and tracking system for the solar heat concentrator arrangement of the present invention is illustrated.

A. Totally Unobstructed Sunlight

Figures 6, 8, 9:
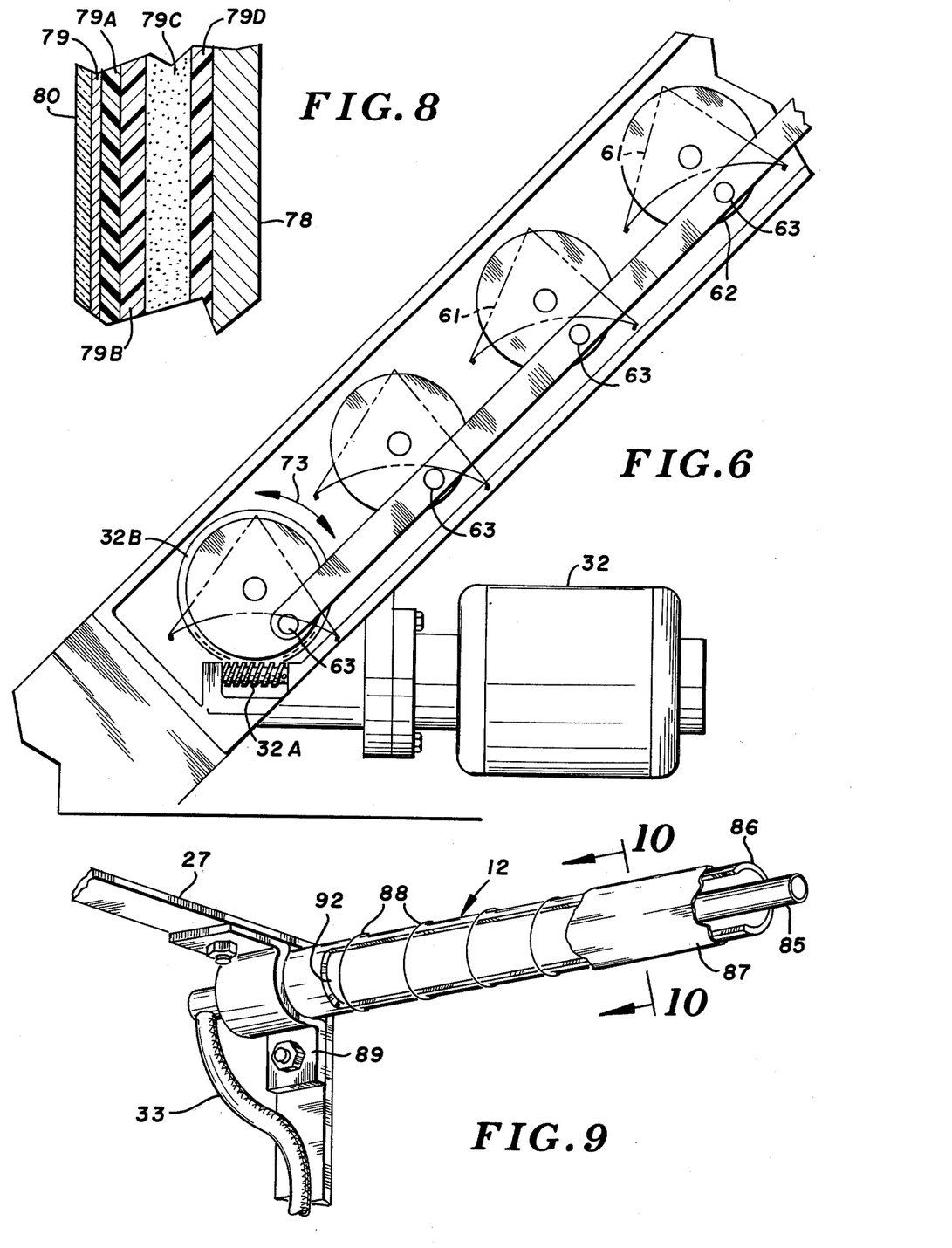
FIG. 6 is a view similar to FIG. 4, and illustrating the disposition of the drive mechanism with the individual elements of the line focus Fresnel array being inverted so as to respond to a no-load situation or become protected from adverse environmental conditions.
FIG. 8 is a detail sectional view on a slightly enlarged scale, and taken along the line and in the direction of the arrows 8—8 of FIG. 7.
FIG. 9 is a fragmentary view of a portion of the absorber means illustrated in FIG. 1, with this view being taken along the line and in the direction of the arrows 9—9 of FIG. 1.

Upon sufficient light striking sun sensor 50, the No. 1 level discriminator 51 which is, in turn, coupled at its output to differential amplifier 52 drives the differential amplifier 52 and, in turn, drive motor 32. The individual reflective panels as have been described at 20 in FIG. 1 rotate from the "storage" or protective mode as illustrated in FIG. 6 to the active mode as is illustrated in FIG. 3. In order to protect the immediate environment, the drive motor 32 may, through its worm gear drive member 32A and ring gear 32B drive the individual reflector elements 20 in a counter-clockwise direction until focus is achieved on the collector 12. Therefore, the focused beam will strike optimizing sensors 53 and 54 at which time the No. 2 level discriminator as shown at 55 overrides the output of sun sensor 50 and causes a signal to differential amplifier 52 which, in turn, is utilized to drive motor 32 and position the sun's image directly on the collector pipe 12. Preferably, the sun sensors 53 and 54 will be disposed in a zone such that direct incident reflected light does not impinge directly on the surface of the sensor. This is due to the high intensities involved. Therefore, these optimizing sensors 53 and 54 will normally be disposed within a housing seeing reflected light only.

B. Intermittent Sun Failure

A built-in time delay allows the No. 2 level discriminator 55 to hold the panel members 20 in position. When the time delay, typically in the range of approximately 5 minutes is exceeded before reappearance of the sun, effective control will revert to the No. 1 level discriminator 51 and the sensor input control reverts from the optimizing sensors 53 and 54 to the sun sensor 50.

C. Total Sun Failure

In the event of total sun failure, the sun sensor 50 is delivering no signal to No. 1 level discriminator 51, and this condition will be utilized to deliver a signal to differential amplifier 52 which will return the reflectors 20 to the "storage" disposition or mode as is illustrated in FIG. 6. As is indicated in FIG. 6, the reflective surface is directed downwardly, toward the surface of the ground, thereby enhancing the ability of the system to protect the face surfaces of the reflectors from environmental damage.

D. High Limit Control

Figure 2:
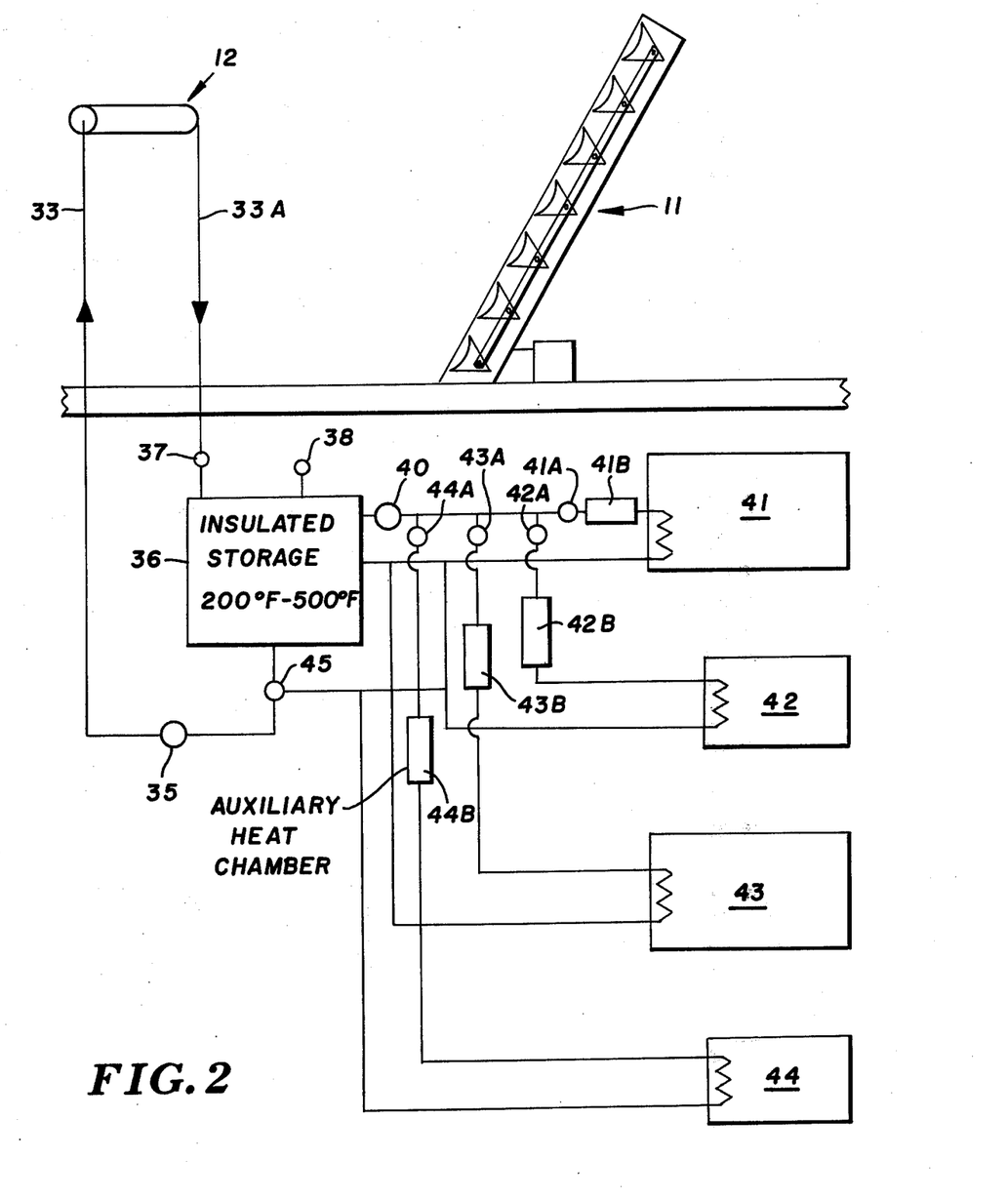
FIG. 2 is a schematic diagram of a typical system installation utilizing the features of the present invention.

The system illustrated in FIG. 3 is adapted to utilization of a high limit control which may be a temperature gauge such as temperature gauge 37 illustrated in the discharge line 33 of collector pipe 12 in FIG. 2, this device acting as a condition sensing element to provide high limit control under modest or no-load conditions. This sensor may be utilized to provide a signal to differential amplifier 52 which will override the sun sensor 50 and return the system to storage mode. This arrangement will prevent continued operation and overheating of the fluid contained in the system.

GENERAL OPERATION

Figures 4, 5:
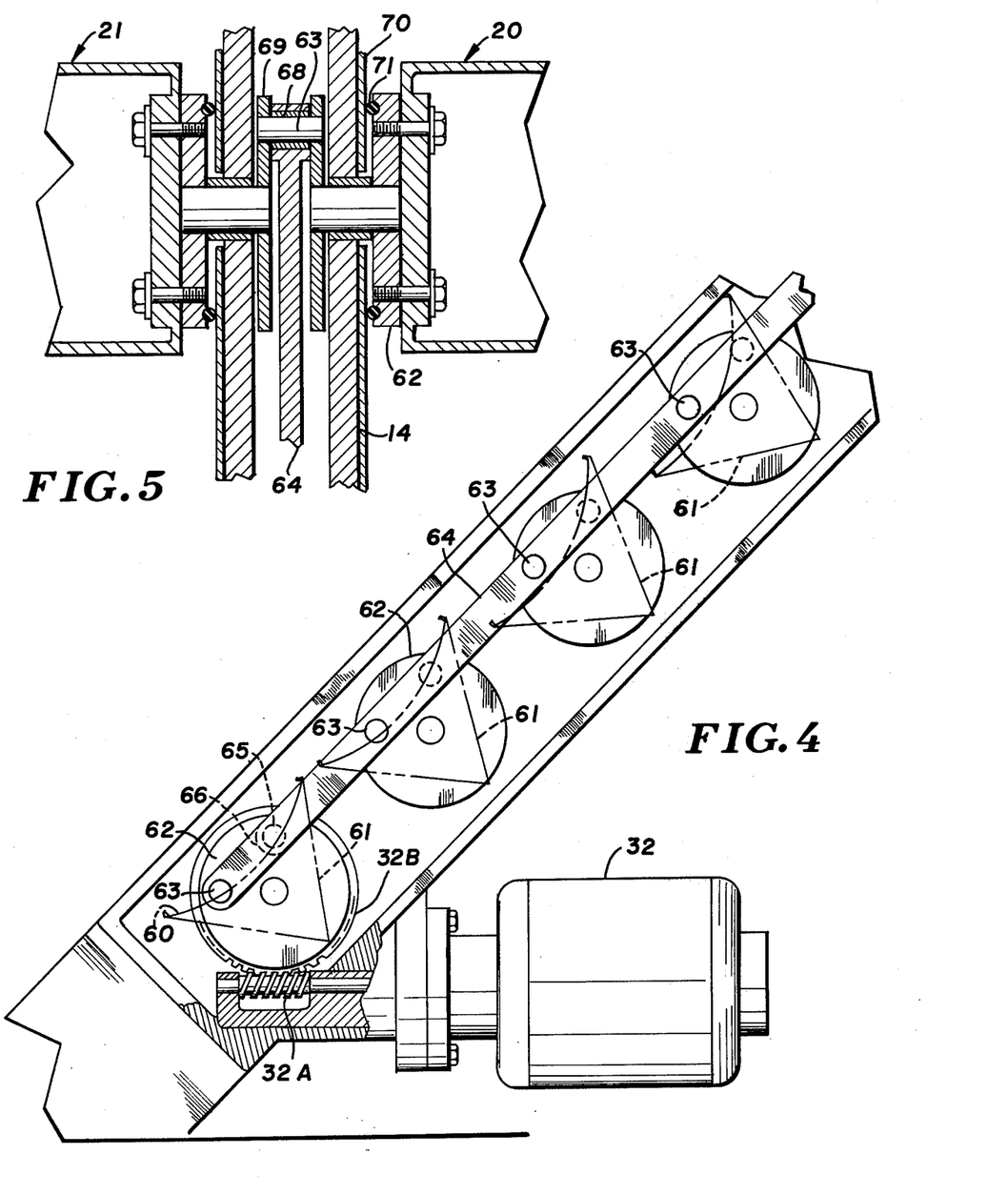
FIG. 4 is a side elevational view, partially in section, and illustrating the details of a typical drive system for the line focus Fresnel array of the present invention.
FIG. 5 is a detail sectional view of the drive means illustrated in FIG. 4, and taken along the line and in the direction of the arrows 5—5 of FIG. 7.

Attention is now directed to FIGS. 4 and 5 of the drawings wherein details of the linkage means being utilized to move the individual reflector panels in the array is shown. The reversible drive motor, as previously discussed, is illustrated at 32 and is provided with its worm 32A which, in turn, is in mesh with ring gear 32B on the base member of the array, such as reflective surface 60. Each of the individual reflector panels is stretched tautly across triangular frame arrangement 61, as illustrated in both FIGS. 4 and 7, with the triangular frame 61 being sufficiently durable and rigid so as to provide a torque-tube for the rotation of the individual members of the linear focus array, with the torque-tube functioning in non-deforming fashion. Deformation would, of course, present problems in the ultimate focusing of the individual members on the collector pipe surface.

In order to couple the individual reflectors together in gang relationship, crank pins are provided on the circular end plates 62–62 of each of the panels, with the end plates carrying eccentric pins 63–63. Linkage arm 64 is, in turn, coupled across each of the individual pins 63 so as to achieve ganged motion of each of the individual reflectors in the array.

As is illustrated in FIG. 4, the opposed end column is likewise provided with a similar pin and arm arrangement, with one such eccentric pin being illustrated in phantom at 65. A second arm is also provided as illustrated in phantom at 66, with the pins and arms 65 and 66 being offset in arcuate distance of 90° from those illustrated in solid lines at 63 and 64 in FIG. 4. The reason for the offsetting is to avoid a condition of dead-centering in the arrangement, thus insuring a positive and full drive during periods of motion.

FIG. 5 illustrates the individual elements in greater detail. Connecting arm 64 is illustrated as being coupled to eccentric 63 through bushing 68 and end plate or crank 69. The supporting column such as column 14 is also illustrated in FIG. 5, with a covering plate 70 being preferably employed to eliminate dust and dirt from the confines of the arrangement. A dust and weather seal in the form of an O-ring is shown at 71, wherein sealing engagement is made against the surface of cover member 70 and end plate 62 of the reflector panel such as is illustrated generally at 20. It will be noted that the panel 20 illustrated in FIG. 5 may be any of the individual panels in the array, with the exception of the bottom panel carrying the ring gear 32B.

Attention is now directed to FIG. 6 of the drawings wherein the storage or sheltered mode is illustrated. In this disposition, the individual portions of the assembly illustrated in FIG. 5 have been actuated so as to return to the storage disposition. As has been previously indicated, the drive means is provided so as to de-focus the line arrangement by rotating the individual elements in a clockwise direction from the disposition of FIG. 4 to that disposition illustrated in FIG. 6. Double-headed arrow 73 is shown for the purpose of illustrating the operational movement between the dispositions of the elements of the components in FIG. 4 from that of FIG. 6.

Figure 7:
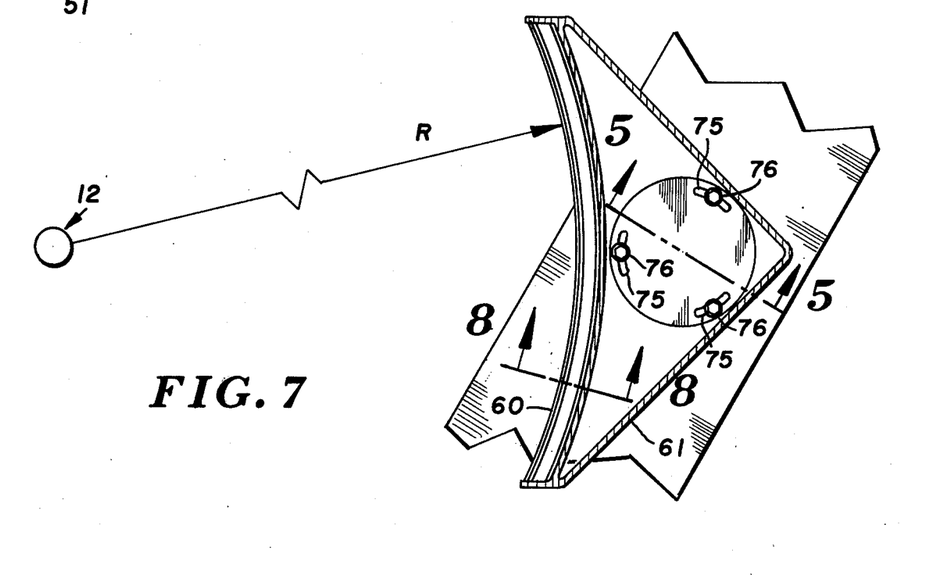
FIG. 7 is a detail side elevational view of a typical reflective panel in the array, and being in the form of a cylindrical parabola, and illustrating the disposition of the panel relative to the absorber means, this figure being shown in fragmentary form.

In order to provide for line focus of the array, on the basis of a Fresnel array, individual arcuate adjustment slots are shown at 75—75 together with mounting screws 76—76 which are employed to provide an initial adjustment of the surface of the reflector panel onto collector pipe 12, as is illustrated. The focal length of panel 60 is, in this instance, equal to the distance R as is illustrated in FIG. 7. In actual installation operations, therefore, the installer will position each of the individual reflector panels in the array so as to achieve a common focal line for each. In this fashion, the incident solar energy is concentrated from the panel onto the surface of the absorber means 12. Preferably, the pivot axis of the reflective surface is in the plane of the surface per se. In this design, therefore, optimum utilization of articulating mechanisms may be achieved.

Attention is now directed to FIG. 8 of the drawings wherein a section of a typical reflector surface is illustrated. As will be appreciated, the structure supporting the reflective surface is one of constant cross-section so as to function as a torque-tube. This structure provides a mounting base for the reflective surface, as well as a protective backing therefor. Inasmuch as the individual reflective elements are supported at their spaced apart ends, the structures must be sufficiently rigid so as to avoid deflection upon those lateral loads occurring due to wind loading and torque loading during adjustment.

In the embodiment illustrated in FIG. 8, a metal backing plate or channel member is illustrated at 78, upon which is applied a metallizing layer of high reflectance such as at 79. A transparent plastic protective coating is provided as at 80 so as to cover the metallized layer 79. In order to achieve optimum reflectivity, metallized layer 79 is preferably either aluminum, or, in some instances, silver. A film of metallizing in excess of approximately 2000 A is normally required to achieve sufficient density of the metallized layers to achieve enhanced reflectivity. For those metals, silver and aluminum, a film thickness of approximately 2000 A is normally sufficient, although when silver is being utilized, a thickness of approximately 1200 A is perhaps optimum from the standpoint of reflectance and economy.

In preparing a typical reflector member, a mold surface is provided having a convex surface for receiving the sandwich of components making up the reflective surface. The initial layer to be applied to the surface will be a film of stress-oriented polyethylene terephthalate (Mylar) having a thickness of ½ mil, and being coated with aluminum, the aluminum having a thickness of at least about 2000 A. A layer of fiberglass is then applied to the stress-oriented polyethylene terephthalate surface, and bonded thereto. Thereafter, a foam backing having a thickness of approximately 1 inch, is applied to the fiberglass layer, in order to increase the modulus of the overall structure. The foam material is a structural foam such as polystyrene or polyurethane having a density of approximately 2 pounds per cubic foot. The back surface of the foam member is thereafter covered with a layer of fiberglass impregnated with a resin such as epoxy resin or the like. Each of the two layers of fiberglass is preferably impregnated with a durable resin such as epoxy or acrylic, with such resins being, of course, commercially avilable. A protective coating is applied to the metallized layer, with the protective coating preferably being an acrylic top coat in the form of a lacquer. A polymer film may be successfully utilized for this purpose, however. The transparent plastic coating 80 which functions as a protective coating for the metal is preferably acrylic or, although in certain instances, FEP Teflon may be utilized. A film, if utilized, may be between about 0.25 mil up to about 1 mil with either being appropriate. Typically, an outer film or protective coating 80 is utilized, such as an acrylic coating, which encloses aluminum layer 79 which is prepared as an aluminized coating of stress-oriented polyethylene terephthalate, such as at 79A. Such aluminized film in the form of aluminized Mylar is available from the E. I. DuPont deNemours Corp. of Wilmington, Del. A layer of epoxy fiberglass, cured to a rigid layer is shown at 79B with the urethane foam layer being shown at 79C.

surface. Thus, for example, a pattern of individual reflective elements may be selected, with the focal length of each being substantially that of the absolute distance between the surface of the reflective element and the surface of the absorber. It will be further appreciated, of course, that with a focal length of approximately 20 feet, for example, a modest de-focusing will not significantly alter the effectiveness of the system inasmuch as the effective width of the absorbing surface may be large when compared to the line focus contemplated.

I claim:

1. In a solar heat concentrator comprising, in combination, solar radiation concentrator means and radiation absorber means for receiving concentrated solar energy from said concentrator means;
   a. said solar concentrator means comprising a plurality of generally parallelly disposed elongated reflector elements each element having a reflective surface and including means for controllably positioning each of said reflective surfaces in solar viewing and absorber reflecting disposition for accommodation of diurnal solar motion;
   b. said radiation absorber means including an elongated generally cylindrical fluid transfer duct having a cylindrical axis extending generally parallel to the elongated axis of each of said reflective surfaces, and with a generally closed peripheral surface, said peripheral surface being disposed about said cylindrical axis and having an arcuate portion defining an energy absorptive zone and an arcuate portion defining a thermally insulative zone, with said energy absorptive zone being disposed in generally opposed relationship to said reflective surface, and with the balance of the arcuate surface of said absorber comprising said insulative zone and being provided with a thermally insulative covering for substantially reducing the thermal energy losses therefrom, said fluid transfer duct being disposed along a plane generally at least as high as that of the uppermost of said elongated reflector elements.

2. The solar heat concentrator as defined in claim 1 being particularly characterized in that said means for controllably positioning said reflector elements includes means for rotation of each of said elongated surfaces about an axis disposed generally parallel to the elongated axis of said reflective surface.

3. The solar heat concentrator as defined in claim 2 being particularly characterized in that said means for controllably positioning said reflective surfaces includes means for directing said reflective surfaces vertically downwardly.

4. The solar heat concentrator as defined in claim 2 being particularly characterized in that said means for controllably positioning said reflective surfaces includes means for rotating said reflective surfaces about an arcuate path upwardly and away from solar viewing disposition.

5. The solar heat concentrator as defined in claim 1 being particularly characterized in that said solar concentrator means comprises frame means for said elongated reflective surfaces, and wherein laterally disposed support columns are provided for mounting of said frame means thereon.

6. The solar heat concentrator as defined in claim 5 wherein means are provided for controllably tilting said lateral support columns to accommodate seasonal variations in solar elevation.

7. The solar heat concentrator as defined in claim 1 being particularly characterized in that said elongated reflective surfaces are line focus cylindrical parabolas, each having focal lines converging upon said energy absorptive zone.

8. The solar heat concentrator as defined in claim 1 wherein said energy absorptive zone is coated with a black film.

9. The solar heat concentrator as defined in claim 1 wherein said energy absorptive zone is covered with a transparent film forming an enclosure about the surface of said absorptive zone.

10. The solar heat concentrator as defined in claim 9 wherein said transparent film is fluorinated ethylene propylene.

11. The solar heat concentrator as defined in claim 1 wherein said fluid transfer duct is fabricated from copper.

12. The solar heat concentrator as defined in claim 1 wherein said radiation absorber means comprises a plurality of generally parallelly disposed fluid transfer ducts.

13. The solar heat concentrator as defined in claim 1 wherein said radiation absorber means is disposed between the sun and said reflective surfaces.

14. The solar heat concentrator as defined in claim 1 wherein coupling linkage means are provided between adjacent reflective surfaces.

15. The solar heat concentrator as defined in claim 1 including solar detector means for detecting incident solar radiation.

16. The solar heat concentrator as defined in claim 15 wherein condition responsive means are provided for drivably rotating said reflective surfaces to generally vertically downwardly disposed disposition upon detection of absence of incident solar radiation.

17. The solar heat concentrator as defined in claim 1 wherein solar radiation responsive means are provided for controllably adjusting the arcuate disposition of each of said reflective surfaces in response to diurnal changes in solar elevation.

18. The solar heat concentrator as defined in claim 17 wherein said solar radiation resposive means are positioned in oppositely disposed relationship of the axis of said radiation absorber means.

19. In a solar heat concentrator comprising, in combination, solar radiation concentrator means and radiation absorber means for receiving concentrated solar energy from said concentrator means;
   a. said solar concentrator means comprising a plurality of generally parallelly disposed elongated reflector elements each element having a reflective surface and including means for controllably positioning each of said reflective surfaces in solar viewing and absorber reflecting disposition for accommodation of diurnal solar motion;
   b. said radiation absorber means including an elongated generally cylindrical fluid transfer duct having a cylindrical axis extending generally parallel to the elongated axis of each of said reflective surfaces, the peripheral surface of said duct having an arcuate portion defining an energy absorptive zone and an arcuate portion defining a thermally insulative zone, with said energy absorptive zone being disposed in generally opposed relationship to said reflective surface;
   c. said reflector elements including rigid frame means for providing self-supporting mounting of said reflective surfaces at opposed ends thereof free of torsional and flexural deflection.

20. The solar heat concentrator means as defined in claim 19 being particularly characterized in that said rigid frame means includes an elongated support having a closed cross-section.

* * * * *

UNITED STATES PATENT OFFICE
CERTIFICATE OF CORRECTION

PATENT NO. : 4,022,184

DATED : May 10, 1977

INVENTOR(S) : Donald E. Anderson

It is certified that error appears in the above-identified patent and that said Letters Patent are hereby corrected as shown below.

Column 2, line 15, "to" should read -- of --.

Column 3, line 21, "of" should be deleted.

Column 5, line 47, "cylndrical" should read -- cylindrical --.

Figure 10:
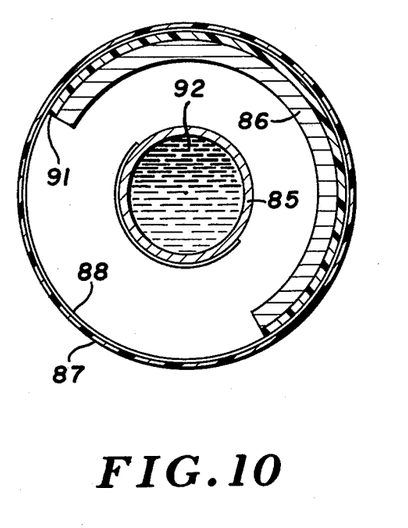
FIG. 10 is a vertical sectional view of the absorber means illustrated in FIG. 9, and is taken along the line and in the direction of the arrows 10—10 of FIG. 10.
Figure 11:
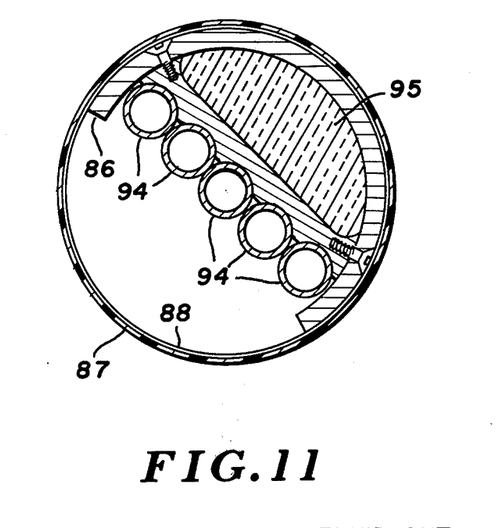
FIG. 11 is a view similar to FIG. 9, and illustrating a modified form of absorber means utilizing a plurality of axially parallelly disposed fluid transfer ducts.
Figure 12:
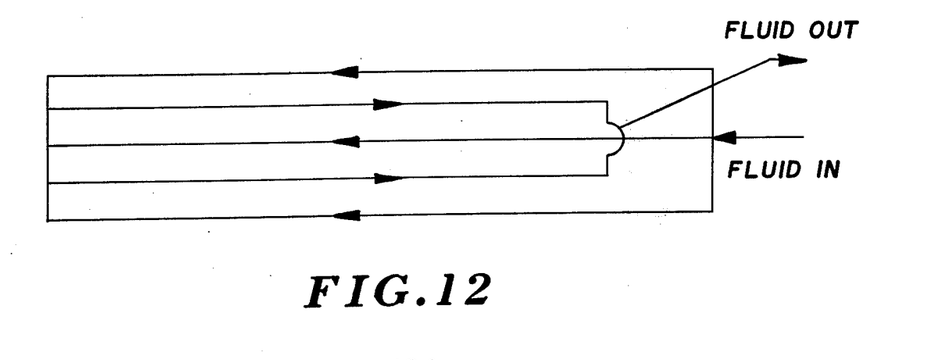
FIG. 12 is a typical flow diagram which may be employed in the arrangement illustrated in FIG. 10.
Figure 13:
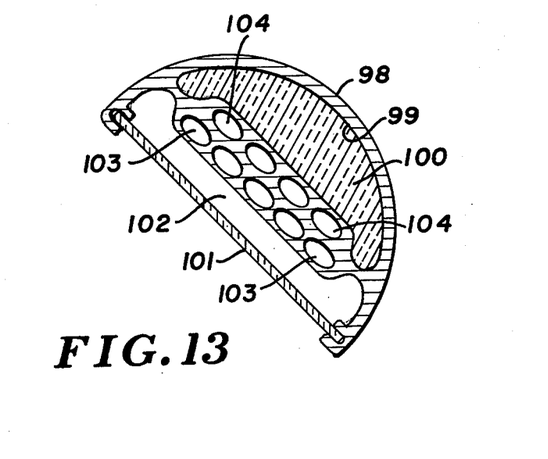
FIG. 13 is a view similar to FIGS. 10 and 11, and illustrating still another modified form of absorber means which may be employed in combination with the present invention.
Figure 14:
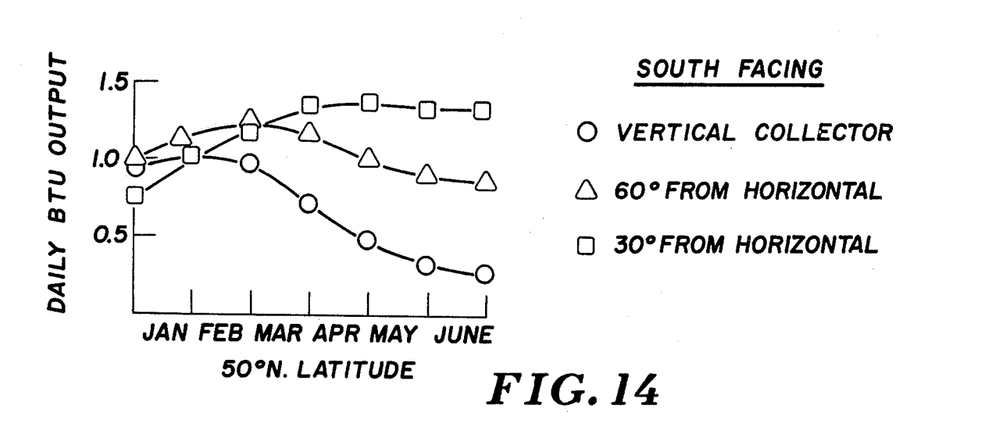
FIG. 14 is a graph illustrating a family of curves plotting daily output in BTU's vs. months of the calendar year at 40° North Latitude, with each member of the family of curves illustrating a different degree of inclination from the horizontal for the lateral supports of the line focus Fresnel array of deflectors, of the type illustrated in FIG. 1.
Figure 15:
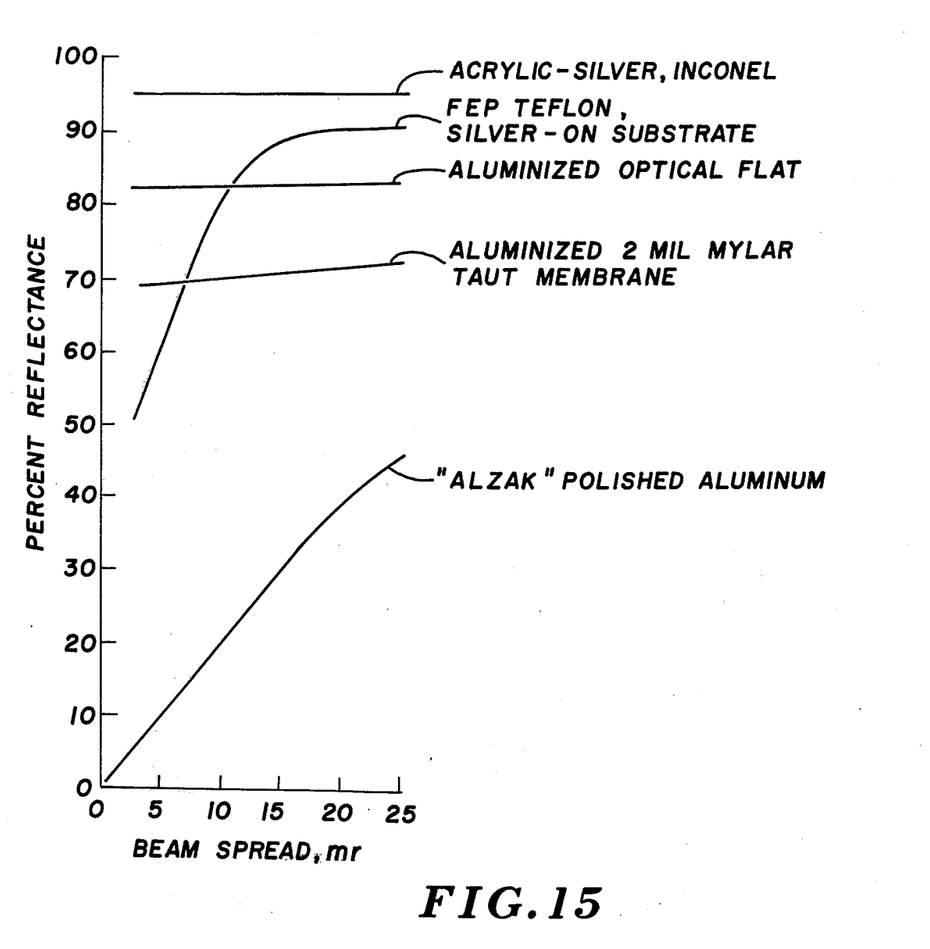
FIG. 15 plots a measure of specularity of various laminate materials useful in the fabrication of the reflective panels employed in the present invention, plotting percent reflectance vs. milli-radians of beam spread in the relevant range of requirements for the line focus Fresnel collector array.

Column 6, line 32, "FIG. 10" should read -- FIG. 9 --. Line 33, "FIG. 9" should read -- FIG. 10 --. Line 47, "deflectors" should read -- reflectors --.

Column 11, line 25, "Pipe 85" should read -- Tubing 85 --.

Signed and Sealed this twenty-sixth Day of July 1977

[SEAL]

Attest:

RUTH C. MASON
Attesting Officer

C. MARSHALL DANN
Commissioner of Patents and Trademarks